(12) United States Patent
King et al.

(10) Patent No.: US 11,550,383 B2
(45) Date of Patent: Jan. 10, 2023

(54) TELEMETRY ENABLED POWER MINIMIZATION IN MESH AND EDGE COMPUTING

(71) Applicant: EMC IP Holding Company LLC, Hopkinton, MA (US)

(72) Inventors: James R. King, Norwood, MA (US); Amy Seibel, Cambridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 47 days.

(21) Appl. No.: 16/750,571

(22) Filed: Jan. 23, 2020

(65) Prior Publication Data

US 2021/0232200 A1 Jul. 29, 2021

(51) Int. Cl.
*G06F 1/32* (2019.01)
*G06F 9/48* (2006.01)
*G06F 1/329* (2019.01)

(52) U.S. Cl.
CPC ............ *G06F 1/329* (2013.01); *G06F 9/4893* (2013.01)

(58) Field of Classification Search
CPC ............................... G06F 1/329; G06F 9/4893
See application file for complete search history.

(56) References Cited

U.S. PATENT DOCUMENTS 8,413,154 B2 * 4/2013 Mergen ................. G06F 9/4893
718/103

* cited by examiner

*Primary Examiner* — Stefan Stoynov
(74) *Attorney, Agent, or Firm* — Workman Nydegger

(57) ABSTRACT

One example method includes performing, in an edge device that includes a power source, operations including monitoring a running process and obtaining, based on the monitoring, power consumption information associated with the running process, adjusting, based on the power consumption information, a priority of the running process, and providing, to an entity, the power consumption information and/or information concerning the priority of the running process.

20 Claims, 4 Drawing Sheets

TELEMETRY ENABLED POWER MINIMIZATION IN MESH AND EDGE COMPUTING

FIELD OF THE INVENTION

Embodiments of the present invention generally relate to power consumption in edge devices. More particularly, at least some embodiments of the invention relate to systems, hardware, software, computer-readable media, and methods for planning and controlling power consumption in edge devices.

BACKGROUND

Serverless and microservice architectures and processes may provide significant scale opportunities, but these advances may also be characterized by a larger overall power consumption and complexity footprints as compared with traditional monolithic architectures. Consequently, there may be more processes/tasks sitting in idle states and utilizing power resources without providing immediate value to customers.

Power consumption concerns extend to other areas as well. For example, edge deployed devices, such as mobile phones for example, have limited battery life and mesh or edge-based compute processes may consume a significant portion of this limited battery life from the users of the edge device where the compute processes run. Rather than cope with short battery life that results from such power consumption, edge device users may simply uninstall applications in an attempt to achieve some preservation of battery life.

However, end users do not typically have visibility into which applications or tasks are consuming the most power. As a result, the users cannot easily make usage decisions that prioritize energy efficiency and make effective use of available battery power. Also, when aggregated to the broader application footprint, the environmental impact of inefficient energy usage due, for example, to multiple inefficient applications being run on multiple devices, can be significant.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
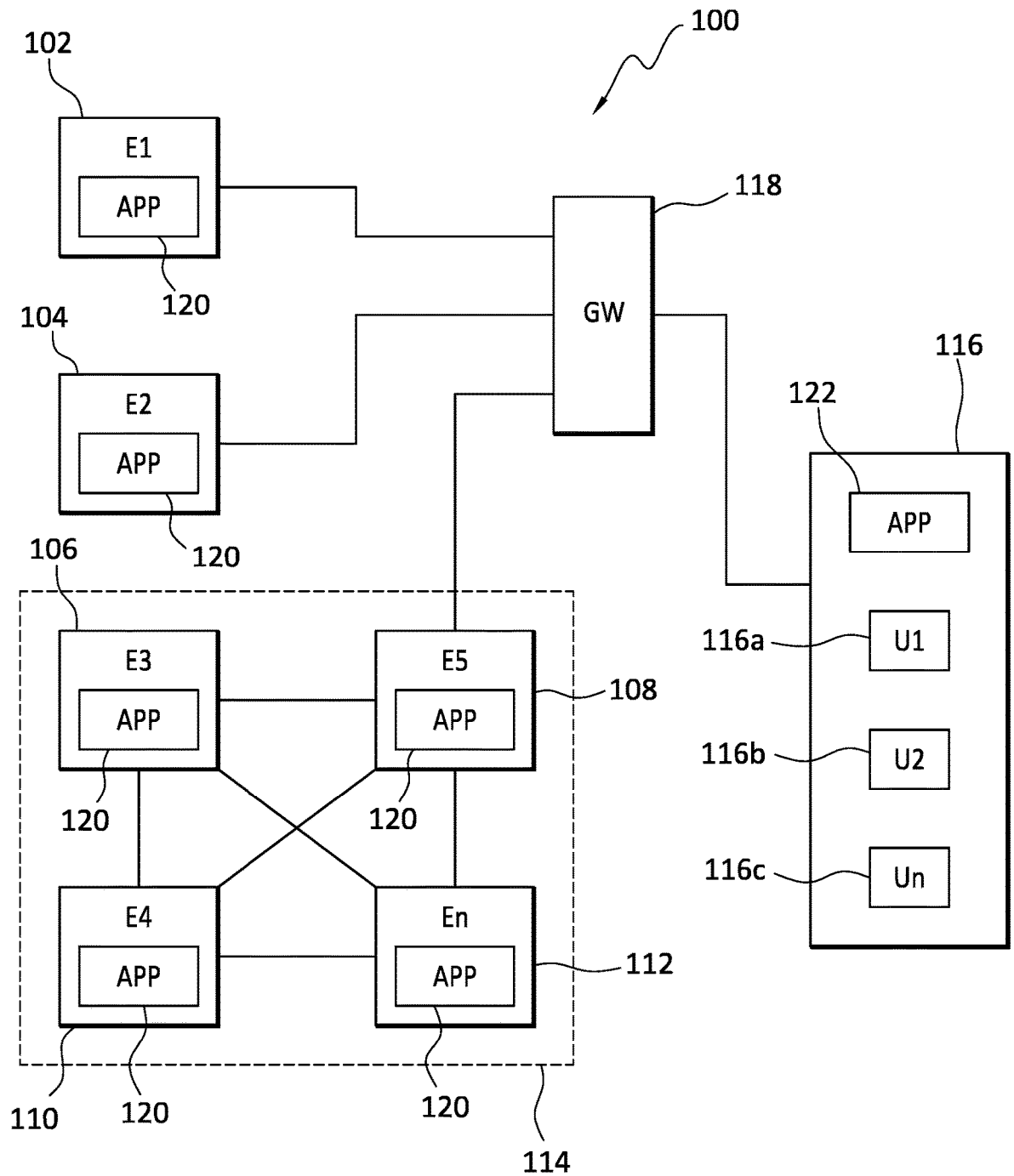
FIG. 1 discloses aspects of an example operating environment for embodiments of the invention.

Embodiments of the present invention generally relate to power consumption in edge devices. More particularly, at least some embodiments of the invention relate to systems, hardware, software, computer-readable media, and methods for planning and controlling power consumption in edge devices.

As advances occur in edge computing, mobile and low power edge devices are becoming an increasingly important aspect of the overall datacenter footprint. In the interest of reducing problems such as latency between, for example, an edge device and a server running a microservice accessed and used by the edge device, some of the processing workload is being moved from the server closer to the point where the processed data is being generated, that is, the edge devices. Because at least some typical edge devices may be relatively lightweight in terms of their processing capabilities, the increased processing load imposed on the edge devices by this new architectural paradigm requires evaluation of key considerations concerning the relationship between end-users and application writers in terms of power consumption and effects on end-user experience.

More specifically, current trends in computing point towards disruptive edge experiences, which start to leverage the increasing compute capabilities of edge devices to achieve end-user goals. What may be referred to as a contract, associated with this new paradigm, requires that a balance must be struck with application writers in their pursuit of distribution of computing workloads such as processing for example. As most edge-compute devices operate in power restricted environments, such as battery, solar, or other low-power footprints where power capacity is limited, the capability to interact with those workloads must be presented to an end-user, of an edge device for example, to ensure the appropriate social contracts are created by and between end-users and application writers.

By combining various technologies, example embodiments of the invention may enable the effective user interaction necessary to create the right social contract for future edge computing architectural paradigms. Such technologies may include, for example, any one or more of: pluggable operating system/orchestrator schedulers that can be influenced by direct user feedback for prioritization of tasks that involve power consumption; telemetry collection for power utilization information, in real-time, of applications/processes running on edge devices; secondary sources and historical records of power consumption of applications; and artificial intelligence (AI)/machine learning (ML) based feedback loops to create optimized power consumption minimization solutions with transfer learning mechanisms.

With these points in mind, at least some example embodiments of the invention may include a scheduler and user interface combination that allows an end-user, datacenter administrator, and/or other users, to access information such as, but not limited to, running tasks or apps, task or app priority, estimated power usage, historical power usage, total power consumption, average power consumption for the task/app, and a comparison to the power consumption of other tasks/apps. One particular example embodiment comprises a smart scheduler that takes data such as the examples just noted and overlays an AI/ML based controller to optimize the overall task scheduling biased towards a primary user preference and overall datacenter and/or end-user device power consumption goals. Some embodiments may enable and/or trigger power-saving settings for certain apps, and tasks, for example.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a user can affirmatively plan, and control, power consumption by an edge device. An embodiment can enable a user to dynamically define, implement, and modify, a power consumption plan at a device level, and/or at a lower level such as an application level. An embodiment of the invention can optimize the use of available power resources by a user device based on various parameters, one or more of which may be specified by the user. Embodiments of the invention can be implemented in an edge device environment, a user mesh, and/or in a cloud, or other network, computing environment. An embodiment can provide a user with real-time information about power consumption in a system or edge device. An embodiment can transmit power consumption information of a device to another system or device. An embodiment can learn user usage patterns and create/modify a power consumption plan based on the usage information. In other embodiments, data center operators, internet or cloud service providers, or 5 g providers, for example, could control and/or set limits on the power consumption of devices or device clusters, apps or app clusters, tasks or task types.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, power planning and management operations, for example. More generally, the scope of the invention embraces any operating environment in which the disclosed concepts may be useful.

Example public cloud storage environments in connection with which embodiments of the invention may be employed include, but are not limited to, Microsoft Azure, Amazon AWS, Dell-EMC cloud environments, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may comprise one or more edge devices 102, 104, 106, 108, 110, and 112. As used herein, 'edge device' embraces, but is not limited to, a device that serves, among other things, as an entry point to a network and/or other system, such as a datacenter, that may be external to the user/device. An edge device may receive data from, and/or communicate data to, the network and one or more constituent elements of the network. An edge device may undertake processing and/or other workloads that might otherwise be handled by the network. Example edge devices include, but are not limited to, any device, which may or may not be portable, that is capable of communication with a network and/or other system. Thus, an edge device may comprise, for example, a mobile phone such as a cellular phone or satellite phone, a laptop computer, a tablet, a global positioning system (GPS)-enabled device, radios such as 2-way radios, and any Internet of Things (IoT) device. Any edge device may include a power source, such as one or more batteries which may or may not be rechargeable, solar cells, or any other power source of limited capacity which must be replenished or replaced when the power of the power source has been exhausted. As well, any edge device may include one or more applications and/or other elements, which may comprise hardware and/or software, that require power from the power source for their operation.

With continued reference to FIG. 1, one or more of the edge devices 102-112 may comprise elements of a mesh topology 114. In the particular example of FIG. 1, the edge devices 106, 108, 110, and 112, comprise elements of the mesh topology 114. As such, any of those edge devices may communicate with one, some, or all, of the other edge devices in the mesh topology 114. In some embodiments, one or more of the edge devices 106-112 may communicate with one or more of the other edge devices 102 and 104.

In some embodiments, one or more of the edge devices 102-112 may communicate with an entity 116 that may comprise, for example, a datacenter. The entity 116 may include, or otherwise be associated with, one or more users U1 116*a*, U2 116*b*, and Un 116*c*, and such users may run and/or cause the running of one or more applications and/or hardware associated with the entity 116. Such applications and/or hardware may consume, and/or cause the consumption of, power supplied by one or more power sources associated with the entity 116. In some cases, communication between one or more of the edge devices 102-112 and the entity 116 may take place by way of one or more gateways such as the gateway 118 for example.

As further disclosed in FIG. 1, any one or more of the edge devices 102-112, and the entity 116, may comprise an instance of an application 120 or 122 operable to perform any of the functionalities disclosed herein, including any and all functionalities relating to dynamic power management in an edge device and/or other entity. Examples of such functionalities are disclosed elsewhere herein. In general, executable code on an edge device may be referred to herein as an 'app' while executable code on an entity such as a datacenter may be referred to herein as an 'application.' Correspondingly, reference may be made herein to one or more 'tasks' performed by an application.

B. Aspects of An Example User Interface and Schedule

Figure 2:
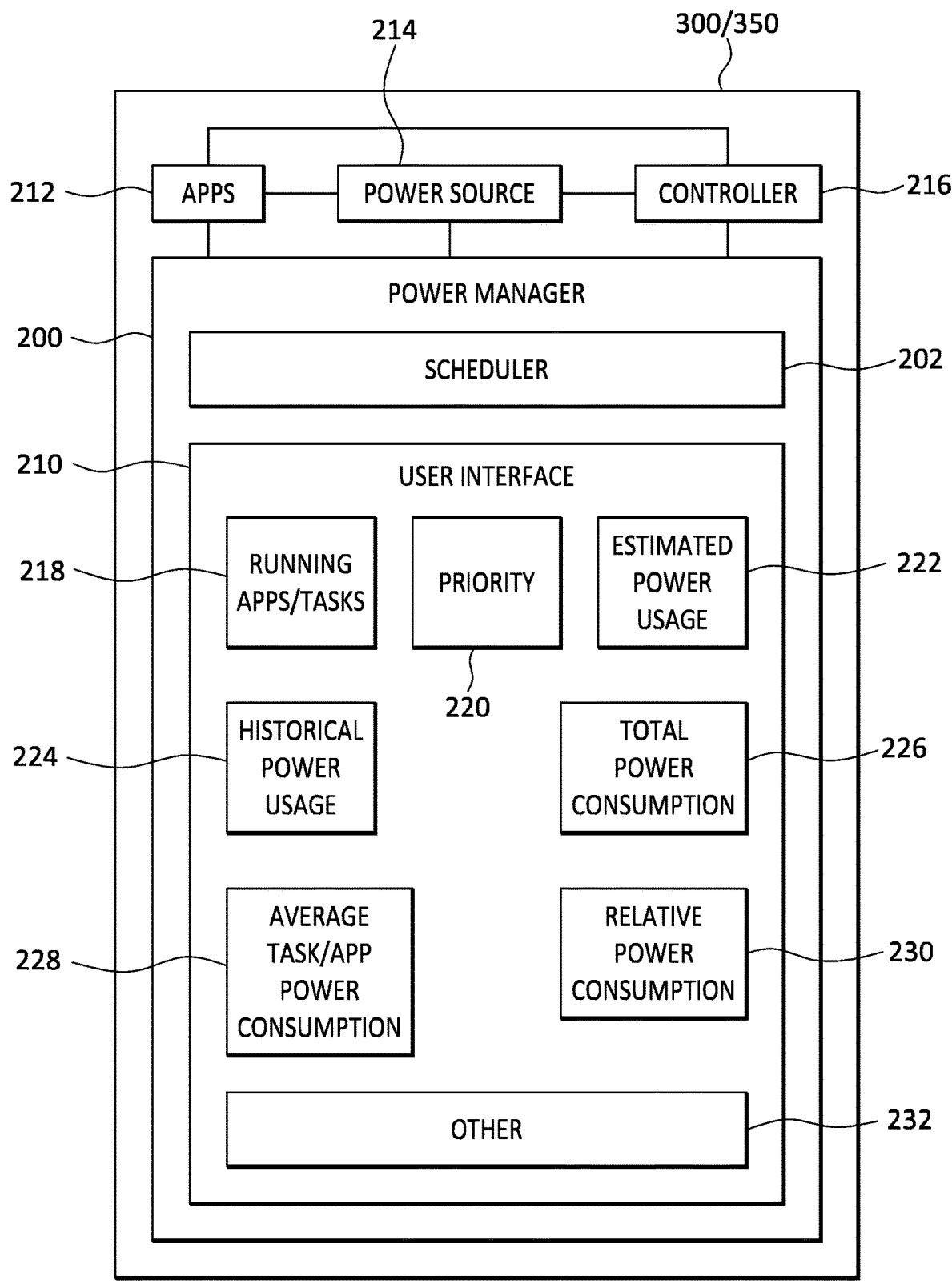
FIG. 2 discloses aspects of an example device and user interface according to some embodiments of the invention.

With reference next to FIG. 2, details are provided concerning aspects of an example implementation of a power manager 200 that comprises a scheduler 202 and a user interface 210. The power manager 200 may take the form of, or comprise, an instance of an app, such as the app 120 disclosed in FIG. 1, that is installed, or installable, on a device 300 such as an edge device. In other embodiments, the power manager 200 may take the form of, or comprise, an application 122 running on an entity 350, such as a datacenter for example. In some cases, embodiments of the power manager 200 may run both on one or more edge devices, and also in an environment such as a datacenter. As well, some embodiments of the power manager 200 may enable a user, such as a manager for example, to view and manage power consumption by a single device, and/or enable a user to view and/or manage power consumption by multiple entities such as, but not limited to, devices, applications, and/or, tasks. Where an embodiment of the power manager enables a user to view/manage power consumption by multiple devices, the power manager may include a toggle or other feature that enables a user to switch between viewing/management of power consumption by all devices in a group, a subset of devices in the group, or any single device in the group. As these examples illustrate, the scope of the invention is not limited to any particular implementation or configuration of the power manager 200. With regard to a group of devices that may be managed by a power manager, the devices in the group may all reside in a common network, or may be distributed across multiple networks.

Part, or all, of the power manager 200 may take the form, for example, of instructions executable by one or more processors to implement any of the functions disclosed herein. As such, some embodiments of the power manager 200 may be downloadable to an edge device, for example, from a website, mesh topology, or other source. As well, the scope of the invention extends to any edge device, or other hardware, that comprises an instance of the power manager 200.

Example embodiments of the power manager 200 may comprise a scheduler 202 and a user interface (UI) 210. In general, the UI 210 may be any UI that is operable to accept input from a user and/or provide output to a user. Thus, example UIs 210 may include, but are not limited to, a graphical user interface (GUI), text based interfaces such as command line interfaces (CLIs), audio devices such as microphones, and audio/video devices such as cameras and video cameras, or a device that causes a user perceptible vibration. Other example UIs are disclosed elsewhere herein. The power manager 200 may be implemented, for example, in an edge device 300 or entity 350, that also comprises one or more apps/tasks 212 (as well as 120, and 122), and a power source 214. In general, the power manager 200, including the scheduler 202 and UI 210, may communicate with, and monitor, the apps/tasks 212 and/or the power source 214. Such monitoring and communication may be performed continuously, at one or more discrete points in time, and/or, on an ad-hoc basis such as when monitoring is requested by a user.

In general, the power manager 200, and the scheduler 202 in particular, may, based in part on information obtained from the power source 214 and/or apps/tasks 212, establish, maintain, modify, and/or delete, a schedule of operations being performed and/or to be performed, by any one or more of the apps/tasks 212. The operation of the scheduler 202 may be controlled by a human operator providing input by way of the UI 210 for example, and/or may be performed automatically. The operations controlled by way of the scheduler 202, which may comprise operations performed by hardware, and/or by software such as apps and applications, may involve the consumption of power by a power source, or power sources, that may be onboard, in the case of an edge device for example, or may reside at a particular site, such as a datacenter for example. Such operations of an app running on an edge device for example, and/or the operations associated with a task performed at an entity such as a datacenter for example, and that are controlled/controllable by way of the power manager 200, may be generally referred to herein as power consumption operations (PCOs). The PCOs embrace operations previously run, operations currently running, and operations that will run in the future. Further, PCOs may include one or more operations that are performed/performable by both the edge device 300 and by the entity 350. Finally, as used herein, the terms power consumption operation and PCO are intended to be broad in scope and embraces an operation, whether it be a task, an operation associated with an app, or any other operation by an app or application that implicates the use of power.

In more detail, the scheduler 202 may consider the prioritization and power utilization of each task or application running on the edge device 300 and/or other entity 350. With the feedback loop from the user, that is, input provided by the user through the UI 210 for example, and secondary source enabled control loops powered by machine learning (ML) and/or historical data, the scheduler 202 may create a best fit model for reasonable power utilization for different user types, along with a value for time to result.

The scheduler 202 may consider any of a variety of different parameters in performing scheduling operations. In some embodiments, a user may select, such as from a menu displayed by the UI 210 for example, the parameters that the user wishes to track and/or control. As well, the user may then specify settings, or values, for one or more of the selected parameters. For example, the user may specify threshold values for each of one or more selected parameters, such as the maximum permissible time, or range of times, for performance of a certain type of task, or the maximum amount of power permitted to be consumed by a particular type of task. Embodiments of the invention may also enable the user to rank the parameters by importance. Where management of an entity such as a device, app, or task, or a group of entities such as devices, apps, and/or tasks, is performed by a single administrator or entity, the administrator may specify and control the values respectively associated with the various parameters. Some parameters may be passive in the sense that they simply report information concerning operation of the device with respect to its power consumption. Other parameters, such as the maximum permissible power in a given time period, may be active in the sense that they may be affirmatively controlled and modified by a user.

Some example parameters, which may embody information gathered from the power source 214 and/or the apps/tasks 212, may include, but are not limited to: task_priority; time_to_result; typical_power_usage; and, current_power_usage_total. Additional, or alternative, parameters may be employed by the scheduler 202. Regarding priorities, those may be set at various different levels including, for example, at a task/thread level, app level, app type, or at a device level if the device under management is one of a group of devices being collectively managed. Where collective management is not implemented, priorities may nonetheless be managed at the device level, by a user and/or administrator for example. With reference to the aforementioned example parameters, the task_priority may be specified by the user to influence the overall time_to_result. For example, increasing priority will be normalized against the expected time_to_result for the necessary computation. The time_to_result may embrace the total amount of time needed to perform a PCO and/or a particular point in time at which the PCO is completed, or scheduled to be completed. The typical_power_usage for a PCO may be used to determine how much of the processing associated with a PCO needs to be performed and when thread/context switching between task/app PCOs can be performed. The current_power_usage_total is a measurement of the total power currently utilized by the task/app. The result of current_power_usage_total/typical_power_usage may provide the necessary incremental pieces to influence achieving the necessary time_to_result requirements.

In terms of setting/modifying priorities, such processes may be implemented in a variety of ways. For example, default priorities may be automatically set by the power manager after it has been installed and performs a scan of the device to identify the power consumers of the device. These default priorities may, or may not, be changed later by the power manager, or user. Priorities may also be manually set/modified, at any time, by a user. In some embodiments, one or more priorities may be controlled by an administrator and may not be modifiable by a user. As well, a priority for a newly installed app, for example, may be automatically assigned by the power manager based on machine learning and/or historical information concerning power consumption by other devices and/or processes on the same device, and/or power consumption by a group of devices to which the device belongs. The way in which a priority may be expressed may vary as well. The priority may be expressed as a number or ranking, or as one of a group of priorities such as low/medium/high. Priority information for an app may be retained at the device and/or elsewhere after the app has been removed from the device, or the priority information may be removed along with the app. Where the priority information is retained, it may be employed by the power manager to set/modify priorities for existing and/or future apps and processes.

As should be apparent from the disclosure herein, there is a wide range of priorities, parameters, settings, and values that may be specified, selected, implemented, modified, and/or, deleted, in any particular embodiment. As such, the discussion herein is provided only by way of illustration and is not intended to limit the scope of the invention in any way.

With continued reference to FIG. 2, the UI 210 may comprise any hardware and/or software that enables a user to provide input to, and/or receive information from, the power manager 200. As such, example UIs, which may be implemented in an edge device and/or an entity such as a datacenter, for example, may comprise, but are not limited to, any one or more of, a visual display screen, a touch sensitive device, a microphone, a speaker, a pointer, and a keyboard. In some embodiments, the UI 210 may be remotely accessed, such as by an administrator. This remote access may, or may not, require permission from the user of the device that is being accessed.

The UI 210 may operate in combination with the scheduler 202 to enable an end-user or datacenter administrator, for example, to view and/or otherwise access, by way of the UI 210: information 218 concerning running tasks or apps; information 220 concerning task or app priority; information 222 concerning estimated power usage; information 224 concerning historical power usage; information 226 concerning total power consumption by an app/task or group of apps/tasks; information 228 concerning average power consumption for the task/app; information 230 concerning a comparison to the power consumption of other tasks/apps; and, various other information 232 which can be any information concerning power consumption by one or more tasks/apps. Such other information 232 may include, for example, an allocated power consumption budget for the device, task, or app, how close the device, task, or app, is to reaching the budget, and/or user configurable alerts such as 'notify me when 90 percent of my allocated budget has been consumed' or 'notify me if my rate of power consumption exceeds [specified threshold]' or 'notify me when my remaining power reserve is expected to be exhausted.' Such notifications may, for example, be provided to a user by way of the UI 210.

In some embodiments, an application, task, or process, for example, may be required to consent to imposition of a charge for usage of any power beyond the quota previously established for that application, task, or process. In the event that the application, task, or process, should exceed the quota, an attempt may be made to pass the associated charge to, for example, the owner/author/seller of the app. If the owner/author/seller of the app does not consent to pay or waive the charge, various corresponding actions may be implemented in response. For example, the application, task or process, whether then running or not, may be automatically deprioritized to a relatively lower priority, such that the application, task, or process may be slowed, or stopped, based on a newly assigned priority. Where multiple tasks are implicated, the lowest priority task may be the first to be slowed or stopped. The tasks may continue to be automatically deprioritized in this way until an entity, such as the power manager 200 for example, determines that the power usage by the user is compliant.

In one particular example embodiment, the scheduler 202 may utilize a controller 216, such as an AI/ML based controller for example, to take the aforementioned information, and/or other information, and use that information to optimize the overall task scheduling to generate a PCO schedule that has a particular bias. In some embodiments, the scheduler 202 may access an aggregate dataset that spans power consumption information for multiple apps, tasks, and/or, devices. The scheduler 202 may make information in the aggregate dataset available to a user, such as by displaying that information with the UI 210.

For example, the PCO schedule may reflect one or more user preferences, such as streaming video, whether or not those preferences are consistent with optimum power usage. As another example, a PCO schedule may reflect a bias toward overall datacenter power consumption goals, and/or a bias toward end-user device power consumption goals. In still another example, the scheduler 202 and UI 210 may enable, and/or trigger, power-saving settings for certain apps. The settings may include, for example, user specified settings, and/or settings automatically generated by the power manager 200 based on user input, historical information, and/or other data. Other settings may include, for example, what the energy consumption budget will be for the user, where the budget may be expressed on a device, app, task, and/or other, basis. The setting may include user-configurable alerts for when the user is close to exceeding, or has exceeded, their energy consumption budget. In some embodiments, the user and/or administrator may override any of the specified settings.

Using the UI 210, the user may perform, and/or cause the performance of, a variety of operations concerning one or more PCOs. For example, the user may dynamically adjust the priority of running PCOs. Since these PCOs may be tied to edge or mesh compute architectures, they may heavily depend, in the absence of the use of embodiments of the invention, on cycle stealing from the devices to accomplish their goals. That is, the PCOs may force a central processing unit (CPU) for example to temporarily suspend one or more other operations being handled by the CPU in order to service the PCOs. Such cycle stealing may thus constitute an anti-pattern in which a response, while commonly implemented in connection with a recurring problem, may often be ineffective, and even counterproductive.

Thus, the ability of some embodiments of the invention to dynamically adjust priorities as between/among multiple PCOs may avoid this circumstance and eliminate, or at least reduce, cycle stealing by one or more PCOs. The problem of cycle stealing may be further addressed by training end-users and datacenter administrators to be aware of end-user constraints in order to help ensure cooperative operation among PCOs. For example, in some cases, the data center, or an edge device, may be permitted, such as by one or more user-specified policies for example, to re-prioritize PCOs, such as when power consumption by one or more of the PCOs exceeds a permissible threshold. In such cases, the end user may be alerted by the power manager 200 as to any changes to a particular PCO status. For example, the UI 210 may issue to a user the notification "[Identify task] has been [prioritized/de-prioritized] due to its [high/low] consumption of energy. In the future, please consider [identify possible PCO changes]." Thus, the user interface 210 may, among other things, serve as a reinforcement learning mechanism.

With continued reference to FIG. 2, the example power manager 200 may gather, generate, process, transmit, and/or provide to a user such as by way of the UI 210, various other information in addition to that already noted. This information may be gathered, generated, processed, transmitted, stored, and/or provided to a user and/or entity on any of a variety of bases including, but not limited to: automatically according to a schedule; in response to a user request; on a recurring or non-recurring basis; and, on an ad hoc basis. Such information may include, but is not limited to: feedback concerning one or more PCOs that have previously been performed; real time power consumption information concerning one or more apps/tasks; power consumption trends on an app/task basis and/or time basis, or aggregate basis; the identity of power consumers such as apps and applications; location of the power consumers; power consumed by individual apps/tasks; aggregate power consumed by multiple apps/tasks; individual/aggregate power consumed by a specified group of apps/tasks over a specified period of time; power remaining in the power source 214; predicted amount of time left before power runs out, based on current app/task mix; 'what if' this application shut down or moved to another time; proposed more optimum power management plan; suggestions to improve use of available power; alerts when available power drops to/below or rises above a threshold; low power mode switch to automatically suspend or cancel one or more apps, running or not, based on remaining available power, the particular apps involved, and/or the respective priority of the apps; and, triggers to trigger performance of one or more actions, such as app/task shutdown or suspension for example, based on actual/predicted power usage by the involved a pp/task.

C. Further Aspects of Example Embodiments and Use Cases

With continued reference to the Figures, it will be apparent that embodiments of the invention may implement a variety of useful functionalities, one of which is telemetry reinforced ML on application workloads with power usage minimization for mesh and edge computation. For example, while mesh and edge computation may benefit from power constraints, the approaches disclosed herein are not implemented in known systems. Rather, typical systems assume excessive 'always on' dedicated hardware whereas, in contrast, disclosed embodiments of a scheduler/measurement loop may obviate the existing paradigm in which scheduling the performance of task(s) depends on cycle stealing.

Another useful aspect of some embodiments of the invention is that such embodiments may provide increased visibility and situational awareness for end-users, creating the necessary social contracts for mesh and edge computation architectures. In contrast, conventional approaches to power management lack the functionalities disclosed herein. As noted elsewhere herein, a typical user confronted with a low power situation may simply stop/uninstall an app whose power consumption and/or rate of power consumption is deemed unacceptable by the user.

Still another useful aspect of some embodiments of the invention is the ability to change task/app priority, and/or the ability of the task/app to run, based on projected and/or historical energy consumption. For example, an end user and/or the data center operator, either a human or a system, may set thresholds for acceptable power consumption on a certain app/task/device, either at the app/task/device level or at the network level, or for a specified grouping of apps, tasks, devices, and/or, networks. Assuming the appropriate policies were in place for this, the apps/tasks with heavy utilization may be de-prioritized or stopped, and/or users/developers/vendors may be given a warning of what to change in order to avoid this. This functionality may also be something that the user would configure for themselves. For example, a user may like using Facebook, but may still want to see warnings when the kitten videos they are watching start to consume more energy than the user intended. In this example, the user may see a message stating "You've used 75% of your monthly energy quota for your phone. The Facebook videos you're watching are a big contributor to your energy usage. Are you sure you want to proceed?" Thus, the user has the opportunity to control power consumption by the user device.

Embodiments of the invention may be employed in a variety of different use cases, some additional examples of which are addressed below. Some particular use cases involve mesh and edge computing on mobile devices. When performing mesh or edge computing on a mobile device, for example, power utilization is a primary concern for the user due to the current limitations of battery technologies. As noted earlier, the current paradigm for end-users is to stop or remove applications that utilize excessive battery power. Creating the necessary contract for mesh and edge-based compute on a mobile device means a new social contract needs to exist in which users can dictate and control the extent to which edge computation will be permitted to be performed on their device and, thereby, users are able to control power consumption at, and by, their device. Thus, embodiments of the invention may provide a feedback loop to effectively gamify, and normalize, this concept. In some embodiments, the user may have the option to permit only specific tasks of an app to continue running. That is, the app may continue to run, but only with the user specified tasks. Thus, the user may be able to stop/start any task or group of tasks within a running app. The user may also be able to specify, at app startup, which tasks should run and which should not. Additionally, or alternatively, the user may specify in advance, such as by way of the UI 210 for example, which task(s) of an app should run and which should not.

In another example use case, edge computing may sometimes be performed in a power constrained environment. For example, some edge environments are powered by generators, or even solar power sources. Thus, the overall computation capability is dictated by the amount of power stored or being produced. Therefore, a calculation may be made on each app/task for time to result, that is, the amount of time needed for the app/task to complete its operations, in order to balance all required tasks and distribute available processor cycles accordingly.

A final example use case involves machine learning (ML). For example, a user may have a number of ML jobs to run, with varying degrees of urgency. The user may determine how much power each job would take to run, given the available hardware, and then assign the priority/urgency of the job. Additionally, or alternatively, the device/app/UI may provide this information to the user, such as by way of the UI 210 for example, so that the user may then make an informed decision. This information may then be passed to the scheduler, which may then generate a schedule that satisfies the user priority/urgency requirements, and minimizes power consumption within the bounds of those requirements. This process may be automated in some embodiments.

D. Example Methods

Figure 3:
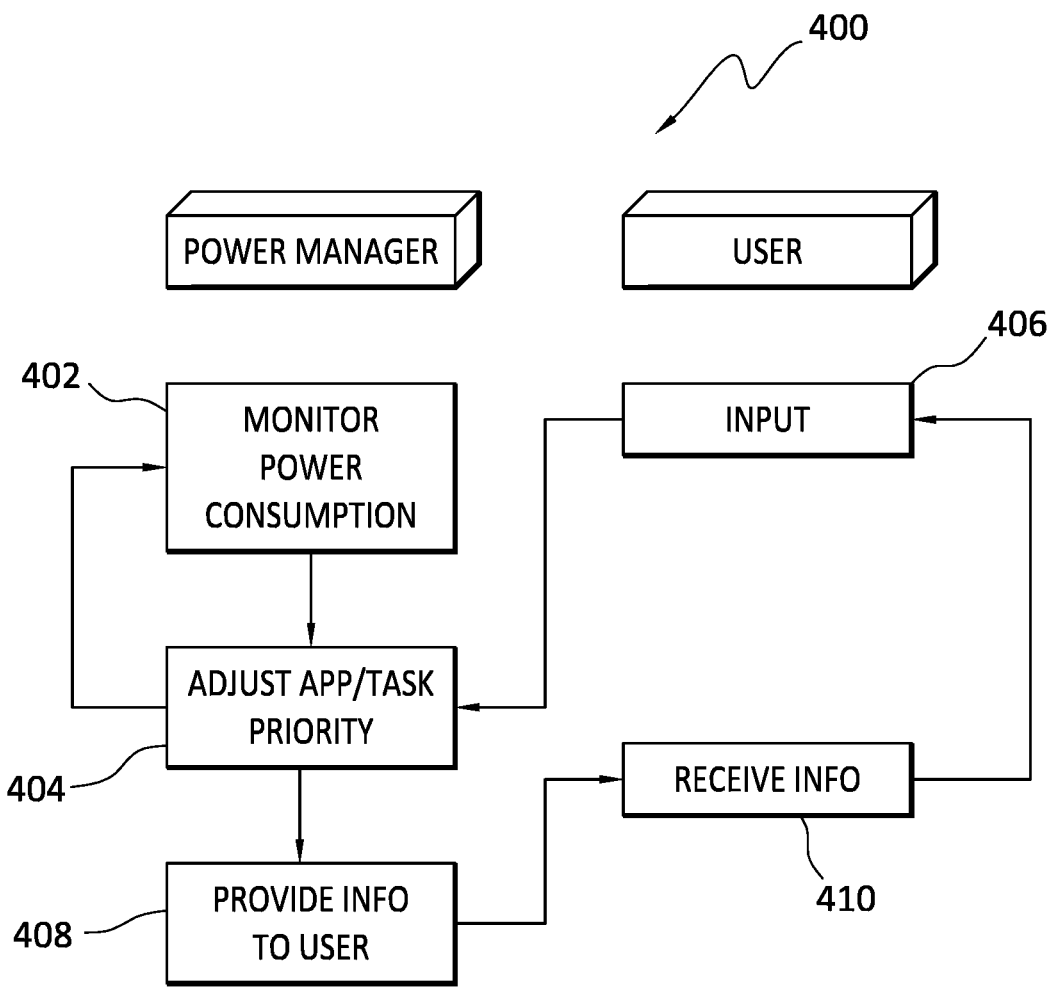
FIG. 3 discloses aspects of an example method for managing power consumption by a device.

With reference now to FIG. 3, details are provided concerning some methods according to one or more embodiments of the invention, where one example method is denoted generally at 400. In the example of FIG. 3, at least part of the method is performed by a power manger, examples of which are disclosed herein. The power manager may, or may not, operate in cooperation with a user. For example, in some cases, a power manager may autonomously manage power consumption by one or more apps/tasks, while in other cases the power manager may perform operations based in whole, or in part, upon input received from a user. Finally, the example method 400 may be performed with respect to the operation of either a task, or an app.

In the example of FIG. 3, the method 400 may begin with monitoring 402 of power consumption by an app/task. An app and/or task may be referred to generically as a 'process.' For the monitoring 402, the power manager may be connected to a power source and to the app/task. The monitoring 402 may comprise real-time monitoring that is performed while the app/task is running, and the monitoring 402 may comprise collecting power consumption data. Power consumption data gathered in connection with the monitoring 402 may be locally stored and/or transmitted to another location. For example, the power consumption data may be transmitted in real time from a device such as mobile phone to a datacenter and/or other recipient. If the device is not connected to a communications network, the power consumption data may be locally stored at the device, and then transmitted to a datacenter after the device reconnects with the communication network. As well, the power consumption data may be used to create a new power management plan, or modify an existing power management plan. The former circumstance may apply when, for example, a user has a new mobile phone and wants to set up a power management plan for the mobile phone.

A priority of the app/task, and/or the priority of another app/task, may then be modified 404 based on the power consumption data obtained in connection with the monitoring 402 and/or based on input received 406 from a user by way of a UI for example, and/or based on default information, or from an administrator making a decision on behalf of the user. In some embodiments, one or more other changes, additional or alternative, to the priority adjustment 404 may be performed as a result of the monitoring 402. For example, if the monitoring 402 identifies over, or under, consumption of power by a task/app, relative to a power allotment established for that task/app, the task/app may be shut down. Alternatively, the task/app may not be shut down, but instead the task/app workload may be shifted so as to be performed in an alternative timeframe, and/or the task/app workload may be slowed down, or the task/app workload may be offloaded to another system or device, which may, in terms of power consumption, be able to more efficiently/quickly perform that workload, for completion.

Where a priority modification is implemented, the priority modification 404 may constitute assignment of a higher, or lower, priority to the app/task. That is, as among a group of apps/tasks, an app/task with a relatively higher priority will run before an app/task with lower priority. Thus, where limited power is available, it is possible that higher priority app/task with a greater power requirement, based on historical information and/or monitoring for example, will run to completion, but the relatively lower priority app/task with a lesser power requirement will complete later, or not at all, depending upon how much power remains available after the higher priority app/task is completed. In some circumstances, the lower priority app/task may be performed at about the same time as, or overlapping in time with, the higher priority app/task, but at a different site or location.

As another example, a user may specify priorities as between apps/tasks and/or may specify power consumption limits on a per app/task basis, device basis, server basis, user basis, or other basis. This user input 406 may be used by the power manager to control the amount of power that will be supplied to a particular app/task. When the app/task, device, or user, for example, uses up its assigned power allotment, the app/task will close, or the app/task may be transferred to another system or device for completion. In some instances, the transfer may be performed automatically and may, or may not, be made apparent to the user. In some embodiments, a warning may be issued by the app/task and/or the power manager that the app/task is close to using up its power allotment.

While not specifically indicated in FIG. 3, the information gathered in connection with the monitoring 402 may be used for various other purposes as well. For example, the power consumption data may be used to generate power consumption trendlines on an app/task basis, or other basis, and/or may be used to make predictions about how much power will be needed by an app/task, or group of apps/tasks. As another example, the power consumption information may be used to create triggers that, for example, may shut down an app/task when the app/task has consumed its allotted power. In a further example, the power consumption information may be compared to power consumption information for one or more other apps/tasks to determine, for example, relative power requirements.

Still further, the monitoring 402 may enable a user or administrator to observe, in real time, the power consumption by one or more apps/tasks, or groups of apps/tasks. For example, the power consumption may be graphically displayed on a UI, or otherwise provided to a user 408.

More generally, the information provided to the user 408 may be any information relating to any process or operation performed by, and/or at the direction of, the power manager, examples of which include the monitoring 402 and the priority adjustment 404. The information may comprise a new/updated power management plan, power consumption trend information for one or more apps/tasks, predicted power consumption information for one or more apps/tasks, estimated and/or average power consumption for one or more apps/tasks, and comparative information that shows actual/predicted power consumption by one app/task compared with actual/predicted power consumption by another app/task.

With continued reference to FIG. 3, the provided information 408 may be received 410 by the user. That information received 410 may be employed by the user in making decisions, for example, as to possible adjustments to the relative priority of various apps/tasks. The information received 410 may be employed by the user in making decisions as to whether or not to retain, or delete, one or more apps/tasks. However, the user decides to use, if at all, the information received 408, the user may then generate and communicate further input 406, based on the received information 408, to the power manager. Thus, the processes 406 and 410 may be performed iteratively.

In a similar fashion, the processes 402 and 404 may be performed iteratively. For example, after a priority adjustment 404 and/or other change is made, the power manager may then monitor 402 the task/app whose priority has been adjusted, and/or may monitor 402 any other tasks/apps that are affected by the priority adjustment.

E. Further Example Embodiments

Following are some further example embodiments of the invention. These are presented only by way of example and are not intended to limit the scope of the invention in any way.

Embodiment 1. A method comprising performing, in an edge device, or mesh architecture, that includes a power source, operations comprising: monitoring a running process and obtaining, based on the monitoring, power consumption information associated with the running process; adjusting, based on the power consumption information, a priority of the running process; and providing, to another entity, the power consumption information and/or information concerning the priority of the running process.

Embodiment 2. The method as recited in embodiment 1, wherein the running process is associated with an app that is resident on the edge device.

Embodiment 3. The method as recited in any of embodiments 1-2, wherein providing the power consumption information and/or information concerning the priority of the running process comprises displaying, on a user interface, one or both of the power consumption information and the information concerning the priority of the running process.

Embodiment 4. The method as recited in any of embodiments 1-3, wherein the priority of the running process is adjusted while that process is running.

Embodiment 5. The method as recited in any of embodiments 1-4, further comprising adjusting a parameter associated with the running process based on input received from a user.

Embodiment 6. The method as recited in any of embodiments 1-5, wherein the priority adjustment causes a relative improvement in an efficiency with which power provided by the power source of the edge device is consumed a group of processes that includes the running process.

Embodiment 7. The method as recited in any of embodiments 1-6, wherein the priority comprises a priority for execution of the process and/or a priority for power consumption by the process.

Embodiment 8. The method as recited in any of embodiments 1-7, wherein the adjusting of the priority is triggered automatically based on the power consumption information.

Embodiment 9. The method as recited in any of embodiments 1-8, wherein adjusting the priority of the running process comprises rescheduling a start time and/or finish time of another process associated with an app on the edge device.

Embodiment 10. The method as recited in any of embodiments 1-9, wherein adjustment of the priority of the running process is also based in part on user preference information received by way of a user interface.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
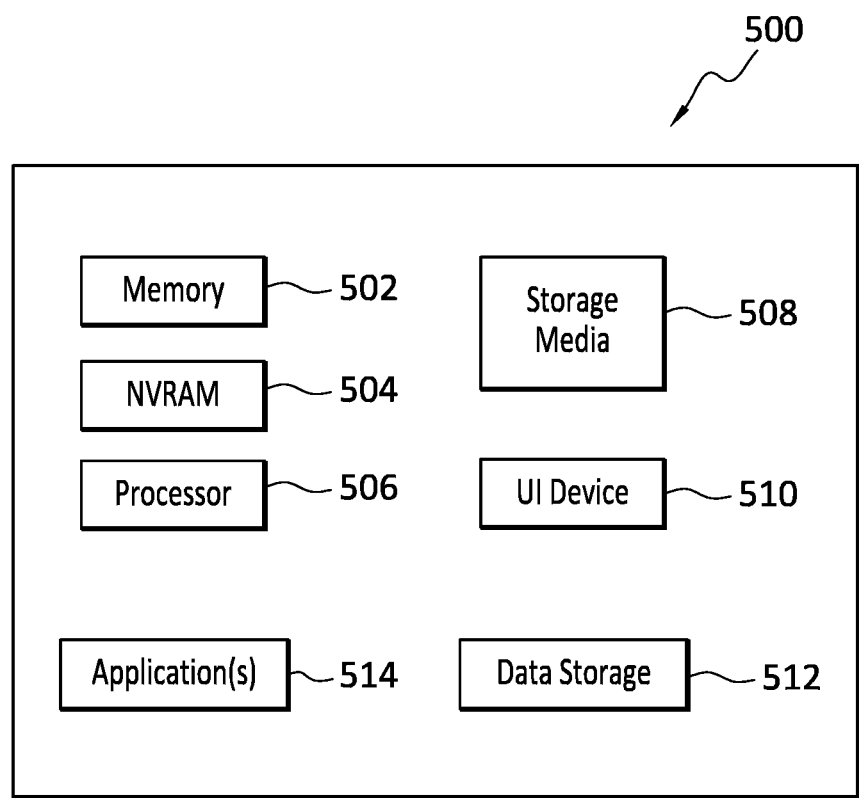
FIG. 4 discloses aspects of an example device.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 4.

In the example of FIG. 4, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to, operations performed by and/or at the direction of a power manager.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing, in an edge device that includes a power source, operations comprising:
receiving, by the edge device, a processing workload of a microservice, wherein the microservice is hosted at another entity, and is accessible by the edge device;
running, at the edge device, a process of the processing workload;
monitoring the running process and obtaining, based on the monitoring, power consumption information associated with the running process;
adjusting, based on the power consumption information, a priority of the running process, and the priority is adjusted with respect to a priority of another process running on the edge device; and
providing, to the another entity, the power consumption information and/or information concerning the priority of the running process.

2. The method as recited in claim 1, wherein the running process is associated with an app that is resident on the edge device.

3. The method as recited in claim 1, wherein providing the power consumption information and/or information concerning the priority of the running process comprises displaying, on a user interface, one or both of the power consumption information and the information concerning the priority of the running process.

4. The method as recited in claim 1, further comprising setting, or changing, a respective power consumption budget for the running process.

5. The method as recited in claim 1, further comprising adjusting a parameter associated with the running process based on input received from a user.

6. The method as recited in claim 1, wherein the priority adjustment causes a relative improvement in an efficiency with which power provided by the power source of the edge device is consumed by a group of processes that includes the running process.

7. The method as recited in claim 1, wherein the priority comprises a priority for power consumption by the running process.

8. The method as recited in claim 1, wherein the adjusting of the priority is triggered automatically based on the power consumption information.

9. The method as recited in claim 1, wherein adjusting the priority of the running process comprises rescheduling a start time and/or finish time of another process associated with an app on the edge device.

10. The method as recited in claim 1, wherein adjustment of the priority of the running process is also based in part on user preference information received by way of a user interface.

11. A non-transitory storage medium having stored therein instructions that are executable by one or more hardware processors to perform operations comprising:
   receiving, by an edge device, a processing workload of a microservice, wherein the microservice is hosted at another entity, and is accessible by the edge device;
   running, at the edge device, a process of the processing workload;
   monitoring the running process and obtaining, based on the monitoring, power consumption information associated with the running process;
   adjusting, based on the power consumption information, a priority of the running process, and the priority is adjusted with respect to a priority of another process running on the edge device; and
   providing, to the another entity, the power consumption information and/or information concerning the priority of the running process.

12. The non-transitory storage medium as recited in claim 11, wherein the running process is associated with an app that is resident on an edge device and consumes power provided by a power source of the edge device.

13. The non-transitory storage medium as recited in claim 11, wherein providing the power consumption information and/or information concerning the priority of the running process comprises displaying, on a user interface, one or both of the power consumption information and the information concerning the priority of the running process.

14. The non-transitory storage medium as recited in claim 11, further comprising setting, or changing, a respective power consumption budget for the running process.

15. The non-transitory storage medium as recited in claim 11, wherein the operations further comprise adjusting a parameter associated with the running process based on input received from a user.

16. The non-transitory storage medium as recited in claim 11, wherein the priority adjustment causes a relative improvement in an efficiency with which power provided by a power source of an edge device is consumed by a group of processes that includes the running process.

17. The non-transitory storage medium as recited in claim 11, wherein the priority comprises a priority for power consumption by the running process.

18. The non-transitory storage medium as recited in claim 11, wherein the adjusting of the priority is triggered automatically based on the power consumption information.

19. The non-transitory storage medium as recited in claim 11, wherein adjusting the priority of the running process comprises rescheduling a start time and/or finish time of another process associated with an app on an edge device.

20. The non-transitory storage medium as recited in claim 11, wherein adjustment of the priority of the running process is also based in part on user preference information received by way of a user interface of an edge device.

* * * * *